United States Patent [19]

Schmidt et al.

[11] Patent Number: 4,660,877
[45] Date of Patent: Apr. 28, 1987

[54] POWER OPERATED GRIPPER

[75] Inventors: Alfred W. Schmidt, Keystone Heights; Douglas G. Reed, Archer, both of Fla.

[73] Assignee: Fabco-Air, Inc., Gainesville, Fla.

[21] Appl. No.: 792,290

[22] Filed: Oct. 28, 1985

[51] Int. Cl.$^4$ .................. B25B 15/08; B25J 15/00
[52] U.S. Cl. .................................. 294/88; 294/106; 294/115
[58] Field of Search .............. 294/88, 100, 106, 115, 294/116, 95, 97; 269/25, 34, 203, 233, 234; 901/31, 36, 37, 38, 39; 414/739, 753

[56] References Cited

U.S. PATENT DOCUMENTS 2,683,386  7/1954  Doebeli.
2,850,926  9/1958  Jobe.
3,774,897  11/1973  Klancnik.
3,817,510  6/1974  Jatcko.
4,211,123  7/1980  Mack.
4,234,223  11/1980  O'Neil ................................. 294/88
4,566,727  1/1986  Yuda ................................... 294/88

Primary Examiner—James B. Marbert
Attorney, Agent, or Firm—Charles A. Bevelacqua

[57] ABSTRACT

A power operated gripper in which both the gripping and releasing movements of the gripping elements are made under power. The gripper comprises a thrust member which is extended and retracted in a linear motion by the power means, gripper arms which swing in an arc to grip and release a workpiece, a cam and roller structure to convert the linear motion of the thrust member to arcuate movement of the gripper arms and adjusting screws which engage the walls of a V-shaped groove in the thrust member to control the extent of its movement in each direction. The parts are constructed and arranged to permit adjustment of the gripper while it is operating so that precise control of the gripping and releasing motion of the gripper arms may be attained under actual operating conditions.

7 Claims, 4 Drawing Figures

POWER OPERATED GRIPPER

BACKGROUND OF THE INVENTION

This invention relates to apparatus for gripping a work piece which is to be moved or worked on by a remotely operated or automatically operated machine. This is the area of art commonly referred to as "robotics."

It is common in this field to grip a work piece externally or internally by means of a gripper actuated by a power device such as a hydraulic or pneumatic cylinder, solenoid or the like. This operation is commonly of a repetitive nature in which identical work pieces are operated on by the gripper in succession. The force applied by the gripper to the work piece must be adequate to hold it firmly but in many operations it is important that the gripper not deform or mar the work piece. Therefore, the ability of the gripper to adjust to a precise aperture and to maintain the adjustment over a series of successive operations is critical. However, with most devices in the prior art, the adjustment must be done by trial and error. That is, the initial adjustment is made by measurement or estimate with the gripper stationary or inoperative. Then the gripper is tried, readjusted as necessary and tried again and so forth. Because of the location or nature of the adjusting means, grippers of the prior art cannot be adjusted while they are actually in operation. Therefore, a precise adjustment, taking into account free play, backlash and other relevant factors, cannot be made.

SUMMARY OF THE INVENTION

The present invention provides a gripper in which a precise adjustment of the gripper can be made while it is actually in operation and the effect of the adjustment seen in the operation of the gripper while it is operating.

The invention comprises apparatus in which a plunger attached to a power piston is extended and/or retracted by movement of the piston in one direction or the other or both under the influence of a pressure fluid electrical apparatus or other power means. Linear movement of the plunger is converted to swinging action of gripper jaws which are effective to grip and hold the external or internal surface of a work piece. The plunger reciprocates inside a housing which remains stationary during movement of the piston and the gripper jaws. Adjustment of the gripper jaws is by means of set screws located on the housing and accessible from the exterior thereof while the gripper is operating. The set screws engage the walls of a V-notch or circumferential groove in the plunger. Adjusting the set screw inward reduces the clearance between the set screw and the corresponding wall of the notch in the plunger and consequently limits the linear travel of the plunger. This ultimately also limits the swinging motion of the gripper arms. Two set screws may be provided, one to control extension of the plunger and one to control its retraction. In turn, this will control the opening of the jaws to grip the interior surface of a work piece and the closing motion of the jaws to grip the exterior surface of a work piece.

To simplify the construction and manufacture, a suitable V-groove extending completely around the circumference of the plunger and of sufficient width to provide adjustment for the full range of motion of the plunger is provided. On smaller sizes of the gripper, however, such a groove may weaken the structure of the plunger. In those cases, separate notches are provided for adjusting inward and outward movement of the plunger, each of said notches extending only partially around the circumference of the plunger.

Any of various well known and suitable means may be provided for converting the reciprocating action of the plunger to swinging movement of the gripper arms or jaws. Cam and roller means are illustrated herein.

It is an object of the present invention to provide a gripper for gripping the internal or external surfaces of a work piece in which adjustment of the opening or closing motion of the gripper arms can be made while the gripper arms are being operated.

It is another object of the invention to provide such a gripper in which adjustment of the gripping action of the arms or jaws can be made simply and easily in such a manner as to account for backlash, wear and other practical factors which cannot be accounted for by adjustment made solely on the basis of measurement.

These and other objects, features and advantages of this invention will become apparent from the following description in conjunction with the accompanying drawings.

DETAILED DESCRIPTION

To illustrate a complete operating device the gripper is shown powered by a double acting pneumatic cylinder. However, it must be understood that any of various well known power means may be used to operate the gripper. For example, the power means may be pneumatic, hydraulic, electrical or any other type. It may be double acting, as illustrated or single acting or single acting with spring return. The type or form of power means is in no way to be considered a limitation of the invention.

Figure 1:
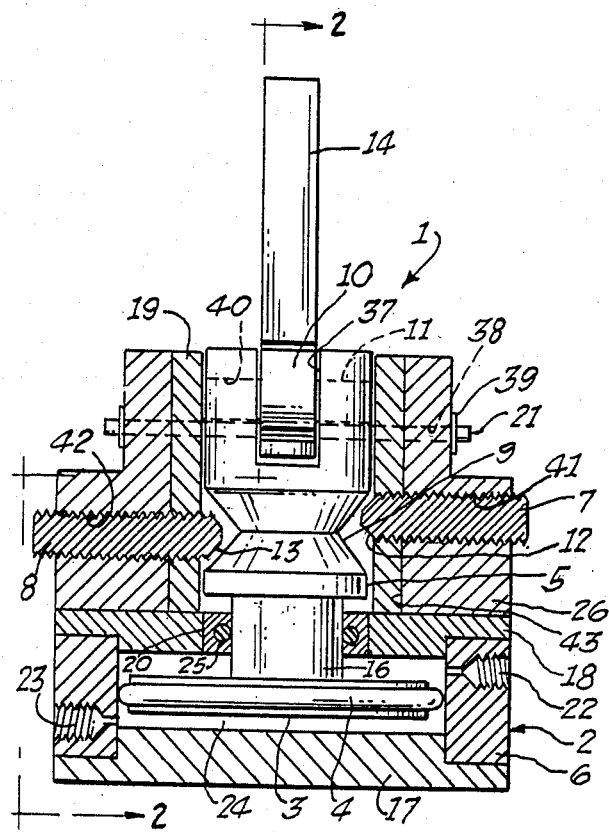
FIG. 1 is a cross-sectional view of the invention.
Figure 2:
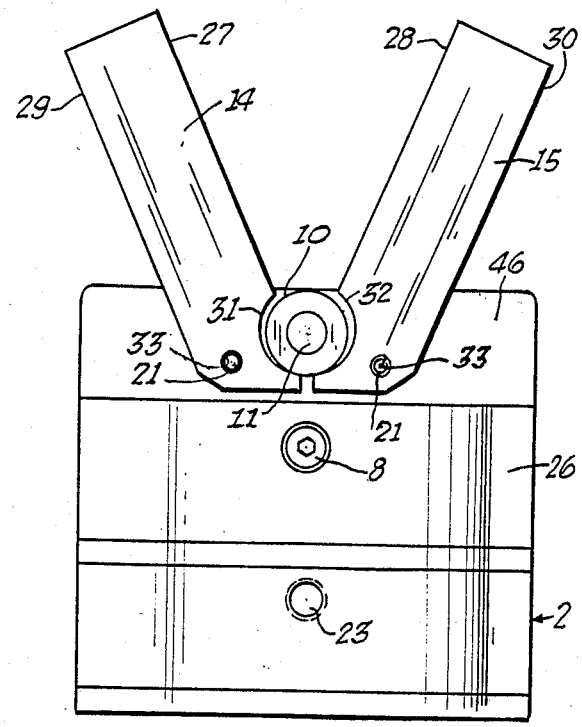
FIG. 2 is a view of the invention taken in the direction of the arrows and along the line 2—2 in FIG. 1.

Referring now to the drawings, the gripper 1 of the invention is shown as comprising a double acting cylinder 2 attached to a gripper arm housing 26 of generally cylindrical form and a pair of gripper arms 14 and 15 actuated by a plunger 5. The cylinder may be any of various readily available devices of this type. For illustration it is shown as a short stroke large diameter cylinder comprising a cylinder housing 6 having a bottom cover 17 and a top cover 18, piston 3 having a seal ring 4 and a piston rod 16 extending out of the top cover 18 through a bearing sleeve 20 having a piston rod seal ring 25. Top and bottom covers 17, 18 are attached to the housing 6 and sealed thereto to prevent the escape of pressure fluid by suitable means such as screws and O-rings, not shown. Cylinder 2 is removably secured to gripper arm housing 26 by suitable means such as screws, not shown. Inlet ports 22 and 23 are provided to admit pressure fluid to chamber 24 to drive the piston in a downward direction or in an upward direction as viewed in FIG. 1. Piston rod 16 is secured to a plunger or thrust member 5 of generally cylindrical configuration by suitable means. For example, piston rod 16 may be provided with a threaded stud and thrust member 5 may have an internally threaded bore which engages the stud. Such connecting means are common and well known and are not shown.

Thrust member 5 reciprocates within a bore 43 in gripper arm housing 26. Bore 43 may be provided with a bearing sleeve 19 to reduce friction.

Gripper arms or jaws 14 and 15 are provided to hold a work piece. The gripper arms have inner gripping portions 27 and 28 respectively and outer gripping portions 29 and 30. Each of the gripper arms has a bore 33 of a size to receive pivot pins 21. Gripper arms 14 and 15 are mounted for pivotal movement on pivot pins 21 within a slot 46 in the free end of housing 26. Slot 46 mates and is in alignment with slot 37 in the plunger 5. Pivot pins 21 are mounted in bores 38 in gripper arm housing 26 and are retained therein by suitable means such as C-washers 39. A roller cam 10 is mounted in a slot 37 in the free end of plunger 5 for rotational motion on a roller rod or spindle 11. Roller spindle 11 extends through the roller cam and through bores 40 in the distal end of the plunger 5.

Arms 14 and 15 have arcuate cam surfaces 31 and 32 respectively which engage the outer surface of the roller 10. It can be seen that as plunger 5 and roller cam 10 move linearly in response to movement of piston 3 and piston rod 16, arms 14 and 15 will be pivoted inwardly and outwardly by the action of roller cam 10 against cam surfaces 31 and 32. The gripping surfaces 27 and 28 will move inwardly toward each other upon movement of plunger 5 in a downward direction to grip the exterior surfaces of a work piece. Gripping surfaces 29 and 30 will move in an outward direction of grip the internal surface of a hollow work piece upon movement of the plunger 5 in an upward direction. Pivotable movement of the arms 14 and 15 will be relative to the linear movement of the plunger 5. Therefore, the extent of movement of the arms and the force applied to a work piece can be controlled by adjusting the linear motion of the plunger. In the invention this is accomplished by the means described below.

Plunger 5 is provided with a circumferential V-notch or groove 9. Threaded bores 41 and 42 are provided extending through the housing 26 and the sleeve 19. Set screw 7, having a tapered end 12, is threaded into the bore 41 and a set screw 8, having a tapered end 13, is threaded into the bore 42. Bores 41 and 42 are offset from each other vertically so that set screw 7 will contact the upper part of the V-notch and set screw 8 will contact the lower portion of the V-notch. As set screw 7 is adjusted inward it will limit the downward travel of plunger 5 and, therefore, the closing action of the gripping portions 27 and 28 on a work piece. As set screw 8 is adjusted inward, it will limit the upward travel of plunger 5 and, therefore, the gripping action of portions 29 and 30 on the interior of a work piece. When a work piece is being gripped on its external surfaces by portions 27, 28 adjustment of set screw 7 will also limit the return action or opening of the gripping surfaces 27 and 28 to release the work piece. Similarly, adjustment of set screw 8 will limit the opening or releasing action of gripping portions 29 and 30. The screw threads on screws 7 and 8 or on bores 41 and 42 or both may be of the locking type so that the screws will maintain their adjusted positions. The location of adjusting screws 7 and 8 on the gripper arm housing has a very important advantage. It permits the opening and closing action of gripper arms 14 and 15 to be adjusted while the gripper is being operated in the mode and with the work piece for which the gripper is being adjusted. This permits precise adjustment to control very closely the pressure applied to a work piece so that it may be held as tightly as necessary to permit the desired operation, but so that marring or deformation does not occur. By adjusting the return action of the jaws to release the work piece as well as the gripping movement, the required movement of piston 3 can be reduced to a minimum and the use of pressure fluid or other power source held to a minimum. This results ultimately in lower use of energy and a substantial cost savings.

Figure 3:
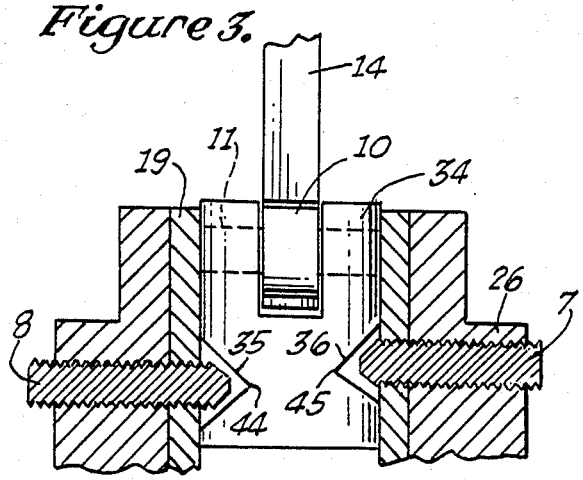
FIG. 3 is a drawing of an optional form of the plunger.
Figure 4:
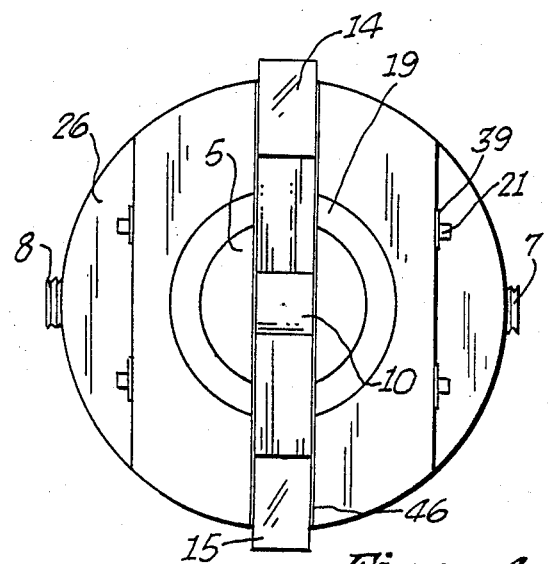
FIG. 4 is a top view of the invention.

FIG. 3 shows a modified form of the plunger or thrust member which is particularly useful in smaller versions of the gripper. In this version the thrust member 34 is formed with two separate notches 35 and 36 extending around only a small portion of the circumference of the thrust member. The notches are offset vertically from each other so that their innermost tips 44 and 45 are not in alignment with each other. This means that a greater cross-section of the thrust member 34 remains and the strength of the member is preserved.

It is obvious to those skilled in the art that although the invention has been shown and described in a limited number of preferred embodiments many variations may be made in the form and structure here presented without departing from the scope of the present invention as set forth in the appended claims.

What is claimed is:

1. A power actuated gripper comprising a housing which remains stationary during operation of the gripper, a thrust member constructed and arranged for linear reciprocating motion in said housing, a pair of gripping arms arranged for swinging motion controlled by said thrust member, power means having a stationary member connected to said housing and a movable member connected to said thrust member, cooperating adjusting means on said housing and said thrust member constructed and arranged to limit linear movement of said thrust member in at least one direction, said cooperating adjusting means including adjustable means on said housing, said adjustable means being adjustable while the gripper is operating by virtue of being on said housing which remains stationary, whereby adjustment of the motion of said gripping arms may be made under actual working conditions.

2. A power actuated gripper as set forth in claim 1 wherein said adjusting means are effective to limit linear movement of the thrust member in both of its directions of movement.

3. A power actuated gripper as set forth in claim 1 wherein said cooperating adjusting means include a screw and a V-groove.

4. A power actuated gripper as defined in claim 2 wherein said adjustable means comprise two screws, one of said screws being effective to limit movement of the thrust member in one direction and the other of said screws being effective to limit movement of the thrust member in the other direction.

5. A power actuated gripper as set forth in claim 1 wherein said gripping arms are mounted on said stationary housing for swinging movement toward and away from each other, and further including cam means interconnecting said thrust member and said pair of f arms whereby reciprocating movement of the thrust member is converted to swinging movement of said arms to grip and release a work piece.

6. A power actuated gripper as set forth in claim 5 wherein said cooperating adjusting means include a screw and a V-groove effective to control movement of the thrust member in one direction and a screw and a V-groove effective to control movement of said thrust member in the other direction.

7. A power actuated gripper for repetitively and consecutively gripping and releasing work pieces of identical size and shape, said gripper including a stationary housing, a thrust member constructed and arranged for linear reciprocating movement in said housing, power means for moving said thrust member, a pair of arms constructed and arranged for swinging motion toward each other for gripping a work piece and away from each other to release a work piece, swinging motion of said gripping arms being controlled by linear movement of said thrust member, cooperating adjusting means on said housing and said thrust member to adjustably limit the linear movement of said thrust member in at least the direction in which it controls motion of the gripping arms toward each other, said adjusting means comprising a screw on said housing which is readily adjustable while the gripper is operating repetitively to grip and release a work piece by virtue of its location on the housing which is stationary, whereby adjustment of the adjusting means to apply the desired gripping force to a work piece can be made with precision under actual operating conditions.

* * * * *